United States Patent
Bradbury et al.

[11] Patent Number: 6,149,178
[45] Date of Patent: Nov. 21, 2000

[54] TRICYCLE PUSHING ATTACHMENT

[76] Inventors: Todd Bradbury, 155 Oshawa Boulevard North, Oshawa Ontario, Canada, L1G 5S6; Dave Roulston, Rural Route 2, Seagrave, Ontario, Canada, L0C 1G0

[21] Appl. No.: 09/199,355

[22] Filed: Nov. 25, 1998

[51] Int. Cl.[7] .................................................. B62K 9/00
[52] U.S. Cl. ........................................ 280/293; 280/304.5
[58] Field of Search ............................... 280/293, 288.4, 280/292, 296, 304.5; 138/120; 285/144.1, 145.1, 145.2, 145.3, 145.4; 294/1.1, 15, 16; 403/109.1, 109.2, 109.4

[56] References Cited

U.S. PATENT DOCUMENTS

| | | | |
|---|---|---|---|
| 1,782,660 | 11/1930 | Meyer | 280/282 |
| 2,672,351 | 3/1954 | Kane | 280/282 |
| 4,445,704 | 5/1984 | Troxler | 280/292 |
| 5,028,066 | 7/1991 | Garth | 280/282 |
| 5,158,313 | 10/1992 | Becker | 280/87.021 |
| 5,217,240 | 6/1993 | Gardenhour, Jr. et al. | 280/282 |
| 5,303,944 | 4/1994 | Kalmus | 280/288.4 |
| 5,306,030 | 4/1994 | Becka | 280/282 |
| 5,582,166 | 12/1996 | Lee | 128/207.14 |

FOREIGN PATENT DOCUMENTS 170 759  2/1986  European Pat. Off. .

*Primary Examiner*—Kevin Hurley

[57] ABSTRACT

A tricycle pushing attachment for permitting a user to push an attached tricycle so that the user has some control over the child on the tricycle. The attachment includes an elongate shaft with opposite proximal and distal ends. A handle is coupled to the proximal end of the elongate shaft. A coupler member is universally pivotally coupled to the distal end of the elongate shaft. The coupler member is attached to a rear portion of a frame of a tricycle located between a seat of the tricycle and a pair of rear wheels of the tricycle.

14 Claims, 2 Drawing Sheets

TRICYCLE PUSHING ATTACHMENT

BACKGROUND OF THE INVENTION

1. Field of the Invention

The present invention relates to devices for pushing a tricycle and more particularly pertains to a new tricycle pushing attachment for permitting a user to push an attached tricycle so that the user has some control over the child on the tricycle.

2. Description of the Prior Art

The use of devices for pushing a tricycle is known in the prior art. More specifically, devices for pushing a tricycle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,338,204; U.S. Pat. No. 5,303,944; U.S. Pat. No. Des. 384,602; U.S. Pat. No. 5,531,494; U.S. Pat. No. 5,577,750; and U.S. Pat. No. 2,134,301.

While these devices fulfill their respective, particular objectives and requirements, the aforementioned patents do not disclose a new tricycle pushing attachment. The inventive device includes an elongate shaft with opposite proximal and distal ends. A handle is coupled to the proximal end of the elongate shaft. A coupler member is universally pivotally coupled to the distal end of the elongate shaft. The coupler member is attached to a rear portion of a frame of a tricycle located between a seat of the tricycle and a pair of rear wheels of the tricycle.

In these respects, the tricycle pushing attachment according to the present invention substantially departs from the conventional concepts and designs of the prior art, and in so doing provides an apparatus primarily developed for the purpose of permitting a user to push an attached tricycle so that the user has some control over the child on the tricycle.

SUMMARY OF THE INVENTION

In view of the foregoing disadvantages inherent in the known types of devices for pushing a tricycle now present in the prior art, the present invention provides a new tricycle pushing attachment construction wherein the same can be utilized for permitting a user to push an attached tricycle so that the user has some control over the child on the tricycle.

The general purpose of the present invention, which will be described subsequently in greater detail, is to provide a new tricycle pushing attachment apparatus and method which has many of the advantages of the devices for pushing a tricycle mentioned heretofore and many novel features that result in a new tricycle pushing attachment which is not anticipated, rendered obvious, suggested, or even implied by any of the prior art devices for pushing a tricycle, either alone or in any combination thereof.

To attain this, the present invention generally comprises an elongate shaft with opposite proximal and distal ends. A handle is coupled to the proximal end of the elongate shaft. A coupler member is universally pivotally coupled to the distal end of the elongate shaft. The coupler member is attached to a rear portion of a frame of a tricycle located between a seat of the tricycle and a pair of rear wheels of the tricycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tricycle pushing attachment apparatus and method which has many of the advantages of the devices for pushing a tricycle mentioned heretofore and many novel features that result in a new tricycle pushing attachment which is not anticipated, rendered obvious, suggested, or even implied by any of the prior art devices for pushing a tricycle, either alone or in any combination thereof.

It is another object of the present invention to provide a new tricycle pushing attachment which may be easily and efficiently manufactured and marketed.

It is a further object of the present invention to provide a new tricycle pushing attachment which is of a durable and reliable construction.

An even further object of the present invention is to provide a new tricycle pushing attachment which is susceptible of a low cost of manufacture with regard to both materials and labor, and which accordingly is then susceptible of low prices of sale to the consuming public, thereby making such tricycle pushing attachment economically available to the buying public.

Still yet another object of the present invention is to provide a new tricycle pushing attachment which provides in the apparatuses and methods of the prior art some of the advantages thereof, while simultaneously overcoming some of the disadvantages normally associated therewith.

Still another object of the present invention is to provide a new tricycle pushing attachment for permitting a user to push an attached tricycle so that the user has some control over the child on the tricycle.

Yet another object of the present invention is to provide a new tricycle pushing attachment which includes an elongate shaft with opposite proximal and distal ends. A handle is coupled to the proximal end of the elongate shaft. A coupler member is universally pivotally coupled to the distal end of the elongate shaft. The coupler member is attached to a rear portion of a frame of a tricycle located between a seat of the tricycle and a pair of rear wheels of the tricycle.

Still yet another object of the present invention is to provide a new tricycle pushing attachment that lets a user push a child on a tricycle when the child becomes tired and is unwilling to pedal the tricycle.

Even still another object of the present invention is to provide a new tricycle pushing attachment that has a ball-and-socket joint that lets the attachment be used by users of different heights and so that the attachment may be extended at a comfortable angle from the tricycle to the hand of the user.

Even still another object of the present invention is to provide a new tricycle pushing attachment that reduces the strain on the back from pushing a tricycle by bending down and pushing on the seat of the tricycle.

Even still another object of the present invention is to provide a new tricycle pushing attachment that lets a user remain in control of what direction a child on the tricycle travels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
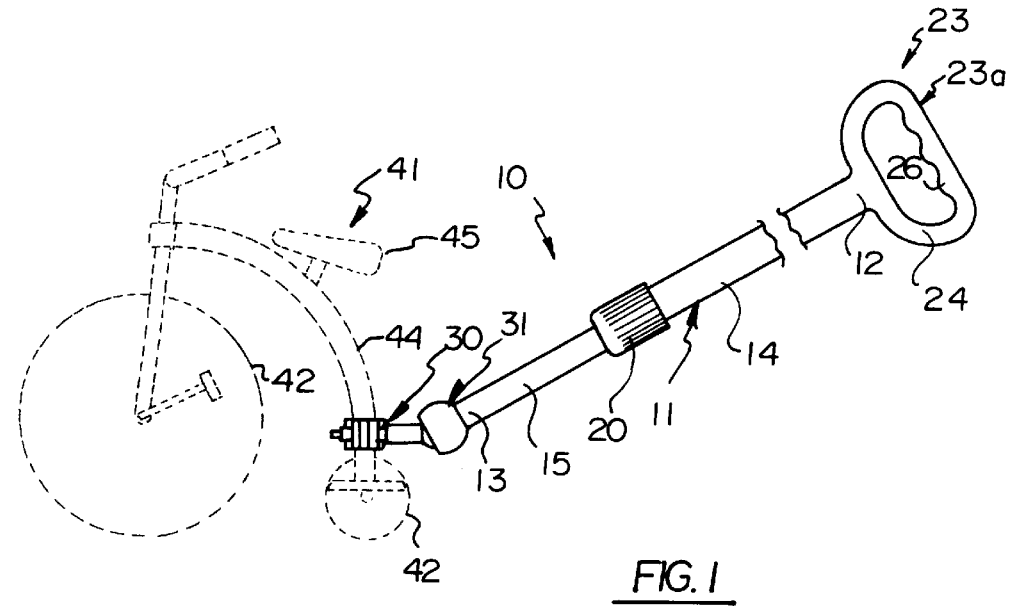
FIG. 1 is a schematic side view of a new tricycle pushing attachment in use attached to a tricycle according to the present invention.

With reference now to the drawings, and in particular to FIGS. 1 through 4 thereof, a new tricycle pushing attachment embodying the principles and concepts of the present invention and generally designated by the reference numeral 10 will be described.

As best illustrated in FIGS. 1 through 4, the tricycle pushing attachment 10 generally comprises an elongate shaft 11 with opposite proximal and distal ends 12,13. A handle 23 is coupled to the proximal end 12 of the elongate shaft 11. A coupler member 30 is universally pivotally coupled to the distal end 13 of the elongate shaft 11. The coupler member 30 is attached to a rear portion of a frame 44 of a tricycle 41 located between a seat 45 of the tricycle 41 and a pair of rear wheels 43 of the tricycle 41.

In use as illustrated in FIG. 1, the pushing attachment 10 is designed for use in combination with a tricycle 41 having a front wheel 42, a pair of rear wheels 43, a frame 44 extending between the front and rear wheels 43, and a seat 45 mounted on the frame 44. The pushing attachment 10 lets a user push the tricycle when a child is on the tricycle. This lets the user help move and control the tricycle.

In closer detail, the pushing attachment 10 includes an elongate shaft 11 having opposite proximal and distal ends 12,13 and a longitudinal axis extending between the proximal and distal ends 12,13 of the elongate shaft 11. Preferably, the elongate shaft 11 has a generally circular transverse cross section generally perpendicular to the longitudinal axis of the elongate shaft 11. The elongate shaft 11 is telescopically extendible along the longitudinal axis and has proximal and distal telescopic portions 14,15. The proximal telescopic portion 14 is located adjacent the proximal end 12 of the elongate shaft 11. The distal telescopic portion 15 is located adjacent the distal end 13 of the elongate shaft 11. The proximal telescopic portion 14 telescopically receives the distal telescopic portion 15 to permit extension and retraction of the distal telescopic portion 15 from the proximal telescopic portion 14.

Figure 3:
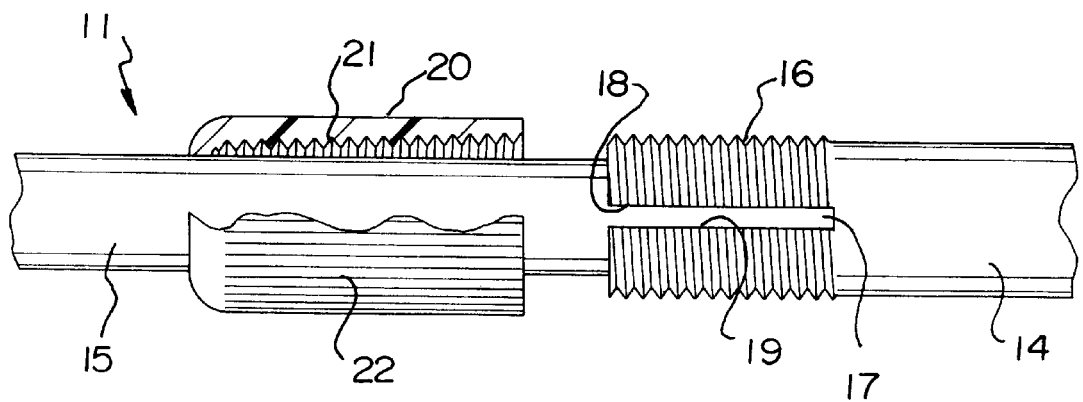
FIG. 3 is a schematic breakaway view of the locking nut region of the present invention.

As illustrated in FIG. 3, the proximal telescopic portion 14 has a threaded portion 16 adjacent the distal telescopic portion 15. The threaded portion 16 of the proximal telescopic portion 14 has at least one longitudinal slot 17 extending generally parallel to the longitudinal axis of the elongate shaft 11. The longitudinal slot 17 of the threaded portion 16 has a pair of generally parallel longitudinal side walls 18,19. A locking nut 20 is disposed around distal telescopic portion 15. The locking nut 20 has a threaded bore 21 threadably engaging the threaded portion 16 of the proximal telescopic portion 14. The threaded bore 21 of the locking nut 20 has a diameter tapering in a direction towards the distal end 13 of the elongate shaft 11 such that the threaded bore 21 has a generally frusto-conical configuration. In use, advancing the locking nut 20 on the threaded portion 16 of the proximal telescopic portion 14 squeezes the longitudinal side walls 18,19 of the longitudinal slot 17 together such that threaded portion 16 of the proximal telescopic portion 14 constricts around the distal telescopic portion 15 to hold the distal telescopic portion 15 in a fixed position with respect to the proximal telescopic portion 14. Preferably, the locking nut 20 has an exterior surface with a plurality of the longitudinal ridges 22 for frictionally enhancing the exterior surface for aiding rotation of the locking nut 20 by a user. The longitudinal ridges 22 extend generally parallel to the longitudinal axis of the elongate shaft 11.

The elongate shaft 11 has a length defined between the proximal and distal ends 12,13 of the elongate shaft 11. In use, the elongate shaft 11 is positionable between an extended position and a retracted position. When in the extended position, the distal telescopic portion 15 is fully extended from the proximal telescopic portion 14. In the retracted position, the distal telescopic portion 15 is inserted into the proximal telescopic portion 14 so that the distal end 13 of the elongate shaft 11 is positioned adjacent the proximal telescopic portion 14. Ideally, the length of the elongate shaft 11 in the extended position is about 5 feet and the length of the elongate shaft 11 in the retracted position is about 3 feet.

A handle 23 is coupled to the proximal end 12 of the elongate shaft 11. The handle 23 is designed for grasping by a hand of a user to push on the elongate shaft 11. Preferably, the handle 23 and the longitudinal axis of the elongate shaft 11 generally lie in a common plane with one another. As illustrated in FIG. 1, preferably the handle 23 is generally D-shaped in configuration 23a and has an arcuate region 24 and an elongate region 25. The arcuate region 24 of the handle 23a positioned adjacent the proximal end 12 of the elongate shaft 11. The elongate region 25 of the handle 23a has a plurality of raised portions 26 extending towards the arcuate region 24 of the handle 23a. The raised portions 26 of the elongate region 25 define a plurality of finger grooves each designed for receiving a portion of a finger of the hand of the user grasping the elongate region of the handle 23 for providing additional comfort and control to the user.

Figure 4:
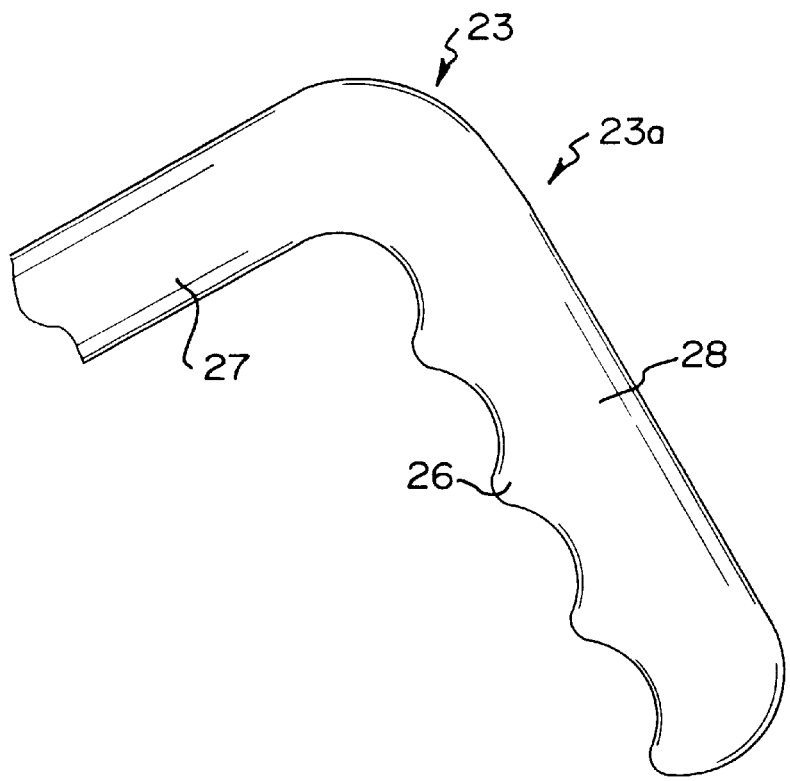
FIG. 4 is a schematic side view of an alternate embodiment of the handle of the present invention.

With reference to FIG. 4, in an alternate preferred embodiment the handle 23 is generally L-shaped 23b and has a pair of elongate regions 27,28 extending generally perpendicular to each other. One of the elongate region 28 of the L-shaped handle 23a has a plurality of raised portions 26 extending in a direction towards the distal end 13 of the elongate shaft 11.

Figure 2:
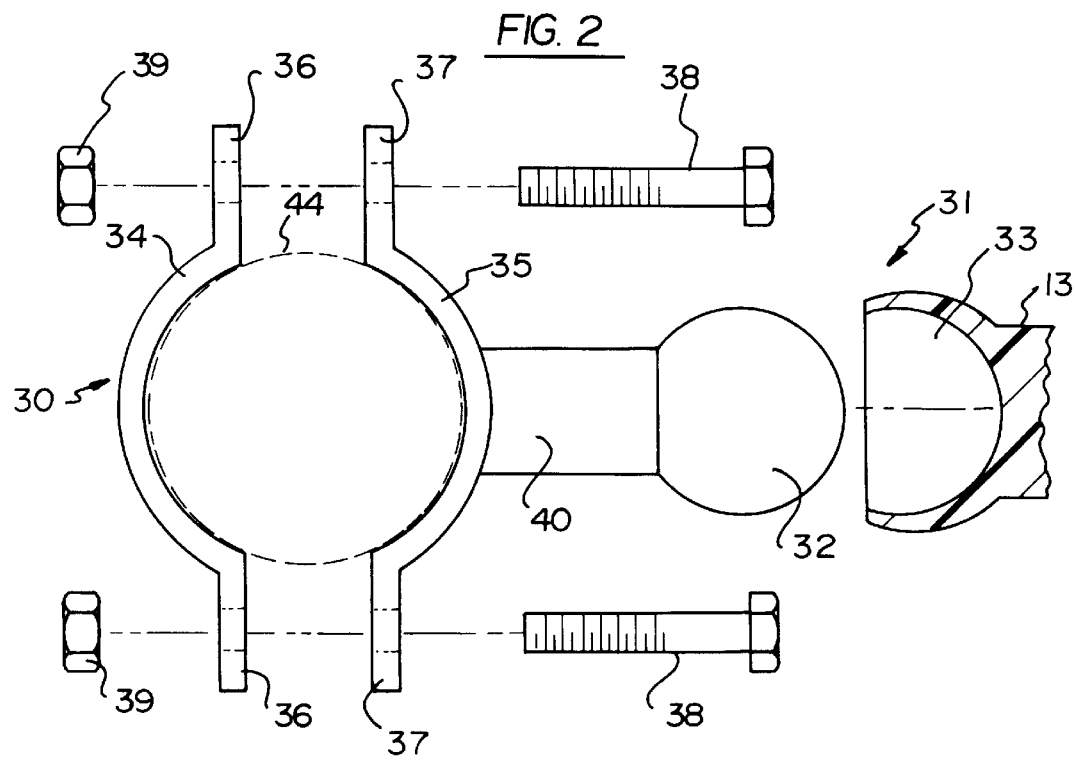
FIG. 2 is a schematic exploded view of the coupler member region of the present invention.

With reference to FIGS. 1 and 2, a coupler member 30 is universally pivotally coupled to the distal end 13 of the elongate shaft 11 to permit pivoting of the coupler member 30 360 degrees about the distal end 13 of the elongate shaft 11. Preferably, a ball-and-socket coupling universally pivotally couples the coupler member 30 to the distal end 13 of the elongate shaft 11. The ball-and-socket coupling 31 includes a ball portion 32 and a socket portion 33. The ball portion 32 is formed on the coupler member 30. The socket portion 33 is formed on the distal end 13 of the elongate shaft 11. The coupler member 30 has a pair opposing C-shaped clamping portions 34,35 defining a generally circular space therebetween designed for extending a rear portion of a frame 44 of a tricycle 41 located between a seat 45 of the tricycle 41 and a pair of rear wheels 43 of the tricycle 41. Each of the clamping portions 34,35 has a pair of coupling flanges 36,37 outwardly extending from the respective clamping portion in opposite direction from the circular space defined between the clamping portions 34,35. Each coupling flange 36 of one clamping portion is associated with a coupling flange 37 of the other clamping portion. Each pair of associated coupling flanges 36,37 face one another. Each pair of associated coupling flanges 36,37 has a threaded fastener 38 extended therethrough through generally coaxial apertures in the coupling flanges 36,37. Each threaded fastener 38 has a nut 39 threaded thereon to couple the respective pair of associated coupling flanges 36,37 together around the rear portion of the frame 44 of the tricycle 41 to secure the coupler member 30 to the rear portion of the frame 44 of the tricycle 41.

Preferably, the coupler member 30 has an elongate cylindrical portion 40 extending between one of the clamping portions 34,35 and the ball portion 32 of the ball-and-socket coupling to space the one clamping portion 35 apart from the ball portion 32 so that the coupling flanges 36,37 do not interfere with the pivoting of the coupler member 30 with the distal end 13 of the elongate shaft 11.

In use, the coupler member is attached to a rear portion of a tricycle. The elongate shaft is then extended to a comfortable length for the user and held in that position with the locking nut. The ball-and-socket coupling permits the user to pivot the shaft to an angle for comfortably holding the handle while standing. The use may then push on the tricycle with the attachment 10 to move the tricycle on the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pushing attachment for use in combination with a tricycle having a front wheel and a pair of rear wheels, a frame extending between the front and rear wheels, and a seat mounted on the frame, said pushing attachment comprising:

an elongate shaft having opposite proximal and distal ends and a longitudinal axis extending between said proximal and distal ends of said elongate shaft;

a handle being coupled to said proximal end of said elongate shaft;

a coupler member being universally pivotally coupled to said distal end of said elongate shaft, said coupler member being adapted for attachment to a rear portion of a frame of a tricycle located between a seat of the tricycle and a pair of rear wheels of the tricycle; and wherein a ball-and-socket coupling couples said coupler member to said distal end of said elongate shaft, said ball-and-socket coupling including a ball portion and a socket portion, said ball portion being formed on said coupler member, said socket portion being formed on said distal end of said elongate shaft such that control of the tricycle is maintained no matter what degree of an angle may be formed between said coupler member and said elongate shaft.

2. The pushing attachment of claim 1, wherein said elongate shaft is telescopically extendible along said longitudinal axis and has proximal and distal telescopic portions, said proximal telescopic portion being located adjacent said proximal end of said elongate shaft, said distal telescopic portion being located adjacent said distal end of said elongate shaft, said proximal telescopic portion telescopically receiving said distal telescopic portion to permit extension and retraction of said distal telescopic portion from said proximal telescopic portion.

3. The pushing attachment of claim 2, wherein said proximal telescopic portion has a threaded portion adjacent said distal telescopic portion, said threaded portion of said proximal telescopic portion having at least one longitudinal slot extending generally parallel to said longitudinal axis of said elongate shaft, said longitudinal slot of said threaded portion having a pair of generally parallel longitudinal side walls, and wherein a locking nut is disposed around distal telescopic portion, said locking nut having a threaded bore threadably engaging said threaded portion of said proximal telescopic portion.

4. The pushing attachment of claim 3, wherein said threaded bore of said locking nut has a diameter tapering in a direction towards said distal end of said elongate shaft so that advancing said locking nut on said threaded portion of said proximal telescopic portion squeezes said longitudinal side walls of said longitudinal slot together such that threaded portion of said proximal telescopic portion constricts around said distal telescopic portion to hold said distal telescopic portion in a fixed position with respect to said proximal telescopic portion.

5. The pushing attachment of claim 4, wherein said locking nut has an exterior surface having a plurality of said longitudinal ridges for frictionally enhancing said exterior surface for aiding rotation of said locking nut by a user, said longitudinal ridges extending generally parallel to said longitudinal axis of said elongate shaft.

6. The pushing attachment of claim 1, wherein said handle and said longitudinal axis of said elongate shaft generally lie in a common plane with one another.

7. The pushing attachment of claim 1, wherein said handle is generally D-shape in configuration and having an arcuate region and an elongate region, said arcuate region of said handle positioned adjacent said proximal end of said elongate shaft.

8. The pushing attachment of claim 7, wherein said elongate region of said handle has a plurality of raised portions extending towards said arcuate region of said handle, said raised portions of said elongate region defining a plurality of finger grooves each adapted for receiving a portion of a finger of the hand of the user grasping said elongate region of said handle.

9. The pushing attachment of claim 1, wherein said handle being generally L-shaped and having a pair of elongate regions extending generally perpendicular to each other.

10. The pushing attachment of claim 1, wherein said coupler member has a pair opposing C-shaped clamping portions defining a generally circular space therebetween adapted for extending a rear portion of a frame of a tricycle located between a seat of the tricycle and a pair of rear wheels of the tricycle.

11. The pushing attachment of claim 10, wherein each of said clamping portions has a pair of coupling flanges outwardly extending from the respective clamping portion in opposite direction from said space defined between said clamping portions, each coupling flange of one clamping portion being associated with a coupling flange of the other clamping portion, each pair of associated coupling flanges facing one another, each pair of associated coupling flanges having a threaded fastener extended therethrough, each threaded fastener having a nut threaded thereon to couple the respective pair of associated coupling flanges together around the rear portion of the frame of the tricycle to secure the coupler member to the rear portion of the frame of the tricycle.

12. The pushing attachment of claim 10, wherein said coupler member has an elongate cylindrical portion extending between one of said clamping portions and said ball portion of said ball-and-socket coupling to space said one clamping portion apart from said ball portion.

13. A pushing attachment for use in combination with a tricycle having a front wheel and a pair of rear wheels, a frame extending between the front and rear wheels, and a seat mounted on the frame, said pushing attachment comprising;

an elongate shaft having opposite proximal and distal ends and a longitudinal axis extending between said proximal and distal ends of said elongate shaft;

said elongate shaft having a generally circular transverse cross section generally perpendicular to said longitudinal axis of said elongate shaft;

said elongate shaft being telescopically extendible along said longitudinal axis and having proximal and distal telescopic portions, said proximal telescopic portion being located adjacent said proximal end of said elongate shaft, said distal telescopic portion being located adjacent said distal end of said elongate shaft, said proximal telescopic portion telescopically receiving said distal telescopic portion to permit extension and retraction of said distal telescopic portion from said proximal telescopic portion;

said proximal telescopic portion having a threaded portion adjacent said distal telescopic portion, said threaded portion of said proximal telescopic portion having at least one longitudinal slot extending generally parallel to said longitudinal axis of said elongate shaft, said longitudinal slot of said threaded portion having a pair of generally parallel longitudinal side walls;

a locking nut being disposed around distal telescopic portion, said locking nut having a threaded bore threadably engaging said threaded portion of said proximal telescopic portion;

said threaded bore of said locking nut having a diameter tapering in a direction towards said distal end of said elongate shaft so that advancing said locking nut on said threaded portion of said proximal telescopic portion squeezes said longitudinal side walls of said longitudinal slot together such that threaded portion of said proximal telescopic portion constricts around said distal telescopic portion to hold said distal telescopic portion in a fixed position with respect to said proximal telescopic portion;

said locking nut having an exterior surface having a plurality of said longitudinal ridges for frictionally enhancing said exterior surface for aiding rotation of said locking nut by a user, said longitudinal ridges extending generally parallel to said longitudinal axis of said elongate shaft;

a handle being coupled to said proximal end of said elongate shaft;

said handle and said longitudinal axis of said elongate shaft generally lying in a common plane with one another;

said handle being generally D-shape in configuration and having an arcuate region and an elongate region, said arcuate region of said handle positioned adjacent said proximal end of said elongate shaft;

said elongate region of said handle having a plurality of raised portions extending towards said arcuate region of said handle, said raised portions of said elongate region defining a plurality of finger grooves each adapted for receiving a portion of a finger of the hand of the user grasping said elongate region of said handle;

a coupler member being universally pivotally coupled to said distal end of said elongate shaft;

wherein a ball-and-socket coupling universally pivotally couples said coupler member to said distal end of said elongate shaft, said ball-and-socket coupling including a ball portion and a socket portion, said ball portion being formed on said coupler member, said socket portion being formed on said distal end of said elongate shaft;

said coupler member having a pair opposing C-shaped clamping portions defining a generally circular space therebetween adapted for extending a rear portion of a frame of a tricycle located between a seat of the tricycle and a pair of rear wheels of the tricycle;

each of said clamping portions having a pair of coupling flanges outwardly extending from the respective clamping portion in opposite direction from said circular space defined between said clamping portions, each coupling flange of one clamping portion being associated with a coupling flange of the other clamping portion;

each pair of associated coupling flanges facing one another;

each pair of associated coupling flanges having a threaded fastener extended therethrough, each threaded fastener having a nut threaded thereon to couple the respective pair of associated coupling flanges together around the rear portion of the frame of the tricycle to secure the coupler member to the rear portion of the frame of the tricycle; and said coupler member having an elongate cylindrical portion extending between one of said clamping portions and said ball portion of said ball-and-socket coupling to space said one clamping portion apart from said ball portion.

14. In combination:

a tricycle having a front wheel and a pair of rear wheels, a frame extending between the front and rear wheels, and a seat mounted on the frame, said pushing attachment comprising;

an elongate shaft having opposite proximal and distal ends and a longitudinal axis extending between said proximal and distal ends of said elongate shaft;

said elongate shaft having a generally circular transverse cross section generally perpendicular to said longitudinal axis of said elongate shaft;

said elongate shaft being telescopically extendible along said longitudinal axis and having proximal and distal telescopic portions, said proximal telescopic portion being located adjacent said proximal end of said elongate shaft, said distal telescopic portion being located adjacent said distal end of said elongate shaft, said proximal telescopic portion telescopically receiving said distal telescopic portion to permit extension and retraction of said distal telescopic portion from said proximal telescopic portion;

said proximal telescopic portion having a threaded portion adjacent said distal telescopic portion, said threaded portion of said proximal telescopic portion having at least one longitudinal slot extending generally parallel to said longitudinal axis of said elongate shaft, said longitudinal slot of said threaded portion having a pair of generally parallel longitudinal side walls;

a locking nut being disposed around distal telescopic portion, said locking nut having a threaded bore threadably engaging said threaded portion of said proximal telescopic portion;

said threaded bore of said locking nut having a diameter tapering in a direction towards said distal end of said elongate shaft so that advancing said locking nut on said threaded portion of said proximal telescopic portion squeezes said longitudinal side walls of said longitudinal slot together such that threaded portion of said proximal telescopic portion constricts around said distal telescopic portion to hold said distal telescopic portion in a fixed position with respect to said proximal telescopic portion;

said locking nut having an exterior surface having a plurality of said longitudinal ridges for frictionally enhancing said exterior surface for aiding rotation of said locking nut by a user, said longitudinal ridges extending generally parallel to said longitudinal axis of said elongate shaft;

a handle being coupled to said proximal end of said elongate shaft;

said handle and said longitudinal axis of said elongate shaft generally lying in a common plane with one another;

said handle being generally D-shape in configuration and having an arcuate region and an elongate region, said arcuate region of said handle positioned adjacent said proximal end of said elongate shaft;

said elongate region of said handle having a plurality of raised portions extending towards said arcuate region of said handle, said raised portions of said elongate region defining a plurality of finger grooves each adapted for receiving a portion of a finger of the hand of the user grasping said elongate region of said handle;

a coupler member being universally pivotally coupled to said distal end of said elongate shaft;

wherein a ball-and-socket coupling universally pivotally couples said coupler member to said distal end of said elongate shaft, said ball-and-socket coupling including a ball portion and a socket portion, said ball portion being formed on said coupler member, said socket portion being formed on said distal end of said elongate shaft;

said coupler member having a pair opposing C-shaped clamping portions defining a generally circular space therebetween;

a rear portion of said frame of said tricycle located between a seat of the tricycle and a pair of rear wheels of the tricycle being extended through said circular space;

each of said clamping portions having a pair of coupling flanges outwardly extending from the respective clamping portion in opposite direction from said space defined between said clamping portions, each coupling flange of one clamping portion being associated with a coupling flange of the other clamping portion;

each pair of associated coupling flanges facing one another;

each pair of associated coupling flanges having a threaded fastener extended therethrough, each threaded fastener having a nut threaded thereon to couple the respective pair of associated coupling flanges together around said rear portion of said frame of said tricycle to secure the coupler member to said rear portion of said frame of said tricycle; and said coupler member having an elongate cylindrical portion extending between one of said clamping portions and said ball portion of said ball-and-socket coupling to space said one clamping portion apart from said ball portion.

* * * * *